United States Patent [19]

Asam et al.

[11] 4,126,804
[45] Nov. 21, 1978

[54] STRIP MICROCHANNEL ELECTRON MULTIPLIER ARRAY SUPPORT STRUCTURE

[75] Inventors: Adolf R. Asam, Daleville; John T. Balkwill, Blue Ridge, both of Va.

[73] Assignee: International Telephone and Telegraph Corporation, Nutley, N.J.

[21] Appl. No.: 758,741

[22] Filed: Jan. 12, 1977

Related U.S. Application Data

[62] Division of Ser. No. 625,432, Oct. 24, 1975, Pat. No. 4,021,216.

[51] Int. Cl.$^2$ .......................... H01J 43/22; H01J 43/24
[52] U.S. Cl. ............................................. 313/105 CM
[58] Field of Search ................. 313/103 CM, 105 CM

[56] References Cited

U.S. PATENT DOCUMENTS

| 2,872,721 | 2/1959 | McGee ..................... 313/105 CM X |
| 3,240,931 | 3/1966 | Wiley et al. .............. 313/103 CM X |
| 3,678,328 | 7/1972 | Cross et al. .............. 313/105 CM X |
| 3,879,626 | 4/1975 | Washington et al. ........ 313/105 CM |
| 3,979,621 | 9/1976 | Yates ......................... 313/103 CM X |
| 4,005,323 | 1/1977 | Yates et al. ................. 313/105 CM |

Primary Examiner—Robert Segal
Attorney, Agent, or Firm—John T. O'Halloran; Peter C. Van Der Sluys

[57] ABSTRACT

A linear array of electron multiplier microchannels is formed by fusing a plurality of solid core glass fibers into a rectangular array. A number of arrays is then sandwiched between a pair of glass plate support members fused into a linear arrangement followed by treating to form the electron multiplier. Treatment comprises subjecting the arrangement to an acid etch for removing the core material and hydrogen firing to activate the core walls for secondary electron emission. The apparatus finds application as an ion-electron converter in focal plane mass spectrometers where high electron gain is required.

3 Claims, 7 Drawing Figures

STRIP MICROCHANNEL ELECTRON MULTIPLIER ARRAY SUPPORT STRUCTURE

This is a division, of application Ser. No. 625,432, filed Oct. 24, 1975, now U.S. Pat. No. 4,021,216.

BACKGROUND OF THE INVENTION

Microchannel plate electron multiplier devices provide exceptional electron amplification but are generally limited in application on account of their delicate glass structure. The device basically consists of a honeycomb configuration of continuous pores through a thin glass plate. Secondary emissive properties are imparted to the walls either by chemically treating the glass walls of the pores or coating an emissive layer thereon. Electrons transporting through the pores subsequently generate large numbers of free electrons by multiple collisions with the electron emissive internal pore surface.

Since each pore corresponds to an individual hollow glass fiber, the entire structural properties of the microchannel plate depends upon the mutual cohesion between each and every individual fiber in the plate. Their use therefore has heretofore been limited to applications where microchannel plates having solid square or solid circular geometries can be employed since structural support is then uniform in all directions of the solid geometry.

One important application which requires the small pore geometry and high electron amplification of microchannel plate electron multipliers is in focal plane mass spectrometers. In this application the microchannel plate electron multiplier serves as an ion-electron converter providing high spectrometer sensitivity and good mass resolution. The effective focal plane in most focal plane mass spectrometers, however, is in the order of 30–40 cm., whereas the largest microchannel plates currently available are only 10 cm. in diameter. Combining three or more 10 cm. long rectangular areas cut from microchannel plates together produces an operable array which is, however, inherently weak structrually and which adversely results in end-to-end variation in electron amplification between the individual composite sections.

The purpose of this invention therefore is to provide a structurally sound strip microchannel electron multiplier array having uniform electron amplification properties from end-to-end together with an overall geometry compatible with the mass spectrometer focal plane.

SUMMARY OF THE INVENTION

A strip microchannel electron multiplier array provides a linear matrix of a plurality of subarrays fused together in a side-by-side relationship. The linear subarrays are supported between a pair of co-extensive glass strips, one on either side of the array. Further structural support is supplied by a pair of solid glass fibers, one at either end of the array, and each fused between the top and bottom glass strip support members and the glass channels at the ends of the array.

A method of making the strip microchannel electron multiplier array is also provided by building a plurality of square blocks out of fused matrices of stacked single-fibers each having a square core of an etchable glass and a square cladding of a etch resistant glass. The blocks are aligned side-by-side in a single plane and fused to each other and to a pair of parallel plates to support the array.

DESCRIPTION OF THE PRIOR ART

One method for producing strip microchannel electron multiplier devices consists of slicing and fusing currently available standard microchannel plate devices. Standard unactivated microchannel plate glass assemblies having a 2.5 cm. diameter are repeatedly sliced into 1 mm. thick sections of varying length. A sufficient number of 1 mm. strips are then placed together side-by-side to provide a long linear array having the overall dimensions of a rectangle 1 mm. high and 36 cm. long. The individual strips are then joined together by heating the glass to its softening temperature and allowing the edges of the individual strips to fuse and become joined. After the strip has been constructed the microchannels are then formed and activated in the usual manner.

In an attempt to overcome the end-to-end variation in electron amplification caused by the large number of individual component strips larger microchannel plate devices can be formed prior to the slicing and fusing process. Microchannel plates as large as 10 cm. can be made in a square array of 100 square centimeters. These large blocks can be subsequently sliced into 1 mm. by 10 cm. strips and fused together to provide the 36 cm. by 1 mm. strip microchannel array as described earlier. Although the time required for assembling the strip microchannel array is decreased by using longer component strips the resultant array still produced large variations in electron amplification along the array. Another problem occurring with the long, thin array, made by the splicing and fusing processes, is the inherent fragility of the device since the only effective support between the individual strips is at the points of fusion.

DESCRIPTION OF THE PREFERRED EMBODIMENT

Figure 1:
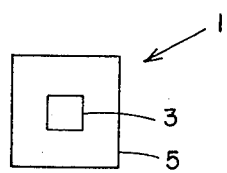
FIG. 1 is a cross-section of a clad fiber having a square cross-section.

FIG. 1 shows a cross-section of a typical starting fiber 1 for the strip microchannel array of this invention. The fiber 1 consists of a core glass 3 having a square cross-section and a cladding glass 5 also having a square cross-section. The cross-section of this embodiment is chosen as square for ease in fitting the fiber together in a later process step but is not a necessary configuration. Circular cross-sectional fibers can also be employed. The core glass 3 is made of a material that is etchable in an appropriate etching solution since the core is removed subsequently in the process. The cladding glass 5 is made from a non-etchable glass and remains to provide the support for the channel which is left after the dissolution or etching of core glass 3. Suitable core glass material is a LAK-3 or RE-693 glass which is readily soluble in dilute hydrochloric acid. A suitable cladding glass is a lead-type glass since the lead oxide is subsequently reduced in the final stages of the manufacturing process to make the inner surfaces of the fiber 1 active for the emission of secondary electrons. Approximately 2,000 of these fibers are then stacked in a square carbon mold and heated in order to lightly pack together to form a square multi 12-18 inches long. The multi is then drawn to a multi-fiber having a square configuration including 2,000 component fibers. The resultant composite fiber is then cut into 3-6 inch lengths. The dimensions of the multi-fiber block approximate a 1 mm. by 1 mm. square and is adjusted during the draw. These multi-fiber squares now constitute what is considered the building blocks for the strip microchannel array.

Figure 2:
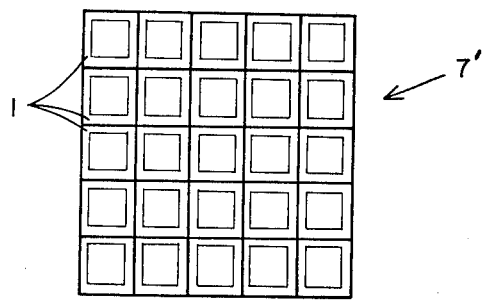
FIG. 2 is a cross-section of a composit multi-fiber formed from the fibers of FIG. 1.
Figure 3:
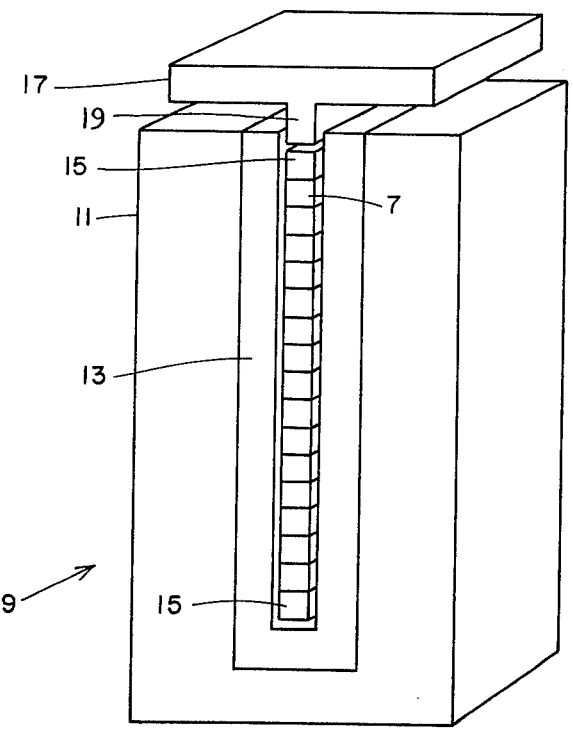
FIG. 3 is a top perspective view of a mold for joining the multi-fibers of FIG. 2 into a linear array.

One example of the multi-fiber building block is shown in FIG. 2. Here the multi-fiber block 7' is shown containing a large number of individual multi-fibers 1 in greatly enlarged form. The multi-fiber blocks 7' are then stacked within a mold 9 consisting of a steel frame 11 and an inner graphite lines 13 which prevents the glass from adhering to the mold during the softening and fusing processes. The stacked multi-fiber blocks 7 are shown within the mold 9 in a continuous linear array. A solid glass fiber 15 is inserted at the bottom of the stacked fiber blocks 7 and also at the top. The purpose of the solid glass fibers 15 will be discussed below in greater detail. The glass blocks 15 should be made of a glass having similar melting and expansion properties to the glass used in making the multi-fiber stack 7. The mold 9 can also have a steel weight 17 with a piston 19 for contacting the top of the glass stacked fiber array 7 to aid in the fusion process by applying pressure to the stack so that the glass blocks within the stack will fuse at a slightly lower softening temperature.

Figure 5:
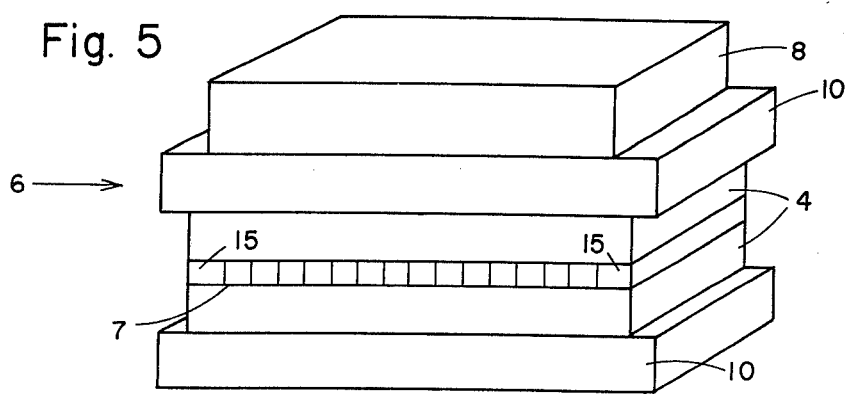
FIG. 5 is a top perspective view of a mold for joining the glass support strips to the linear array of FIG. 4.
Figure 4:
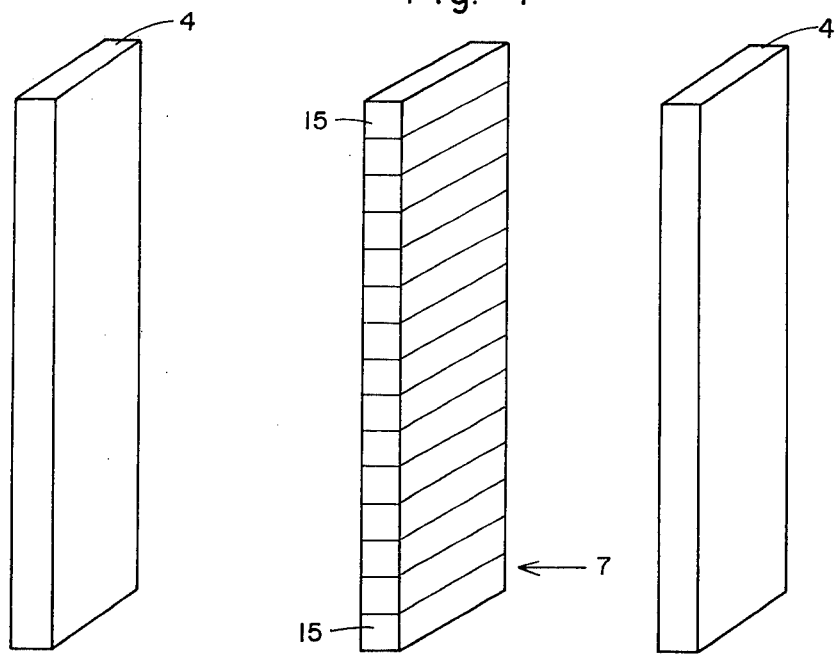
FIG. 4 is a further perspective view of a linear fiber array formed within the mold of FIG. 3 including a pair of glass support strips.
Figure 6:
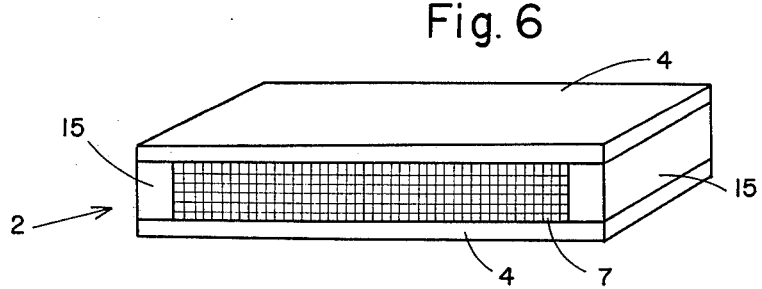
FIG. 6 is a further perspective view of one embodiment of the linear microchannel array of this invention.

After the fibers within the stack 7 have been sufficiently fused together the stack 7 is removed and forms the basis for the final strip array 2 shown in FIG. 6. After the fiber stack 7 is removed from the mold 9 it has the configuration shown in FIG. 4 where the solid support fibers 15 are now integrally fused at the ends of the fiber stack 7. The support strips 4 are then joined to the fiber stack 7 in the following manner. The fiber stack 7 is sandwiched between two support strips 4 which, for the purpose of this invention, are soda-lime glass sheets. Another mold 6 consisting of a weighted top 8 and a pair of graphite blocks 10 is used for heating the fiber stack in close contact with the support strips 4 under the pressure applied by the weighted top 8 of the mold 6. This is shown in FIG. 5.

After a sufficient amount of heat and a sufficient period of time the fiber stack 7 is caused to fuse with the support strips 4 along their linear extent and, also, with the support fibers 15. The support fibers 15 provide additional structural support by means of a three-way contact between the top support strip 4, the adjacent multi-fiber block in the stack 7 and the bottom support strip 4. This three-way support feature occurs at both ends of the stack 7.

The fusing process generally occurs at a temperature of approximately 590° C. within roughly 10-15 minutes for the low temperature lead and soda-lime glasses involved, although different heating temperature and times may be required depending upon the particular glass employed. After the glasses have become fused at 590° C. the entire structure is cooled to 520° C. and annealed at that temperature for a sufficient period to remove any residual strains inherent in the fusing process. Again the annealing temperatures and times involved are dependent upon such factors as whether the support strip, for example, is a glass and also upon the type of glasses used in the multi-fiber stack array 7.

Figure 6A:
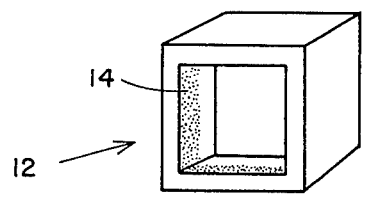
FIG. 6A is an enlarged view of one of the channels in the array of FIG. 6.

When the stacked array 7 has been completely annealed, it is removed from the mold 6 and sliced into strips with a multi-blade pack. The strips can be cut with the multi-blade pack into any desired thickness. The array surfaces are then ground and polished to an optical finish. The optically polished SMCA is then subjected to an etching solution in order to dissolve out the core glass to form the multiplicity of channels having the configuration of the hollow fiber 12 shown in enlarged view of FIG. 6A. After being subjected to repeated leaching and rinsing baths, stacked array 7 is then treated in a reducing atmosphere in order to render the lead glass emissive to secondary electrons.

The finished linear strip microchannel array 2 has the configuration shown in FIG. 6. Here the top support strip 4 is shown along with the multiplicity of hollow fibers contributing to the stack 7. At this point in the strip micro-channel array manufacturing process, a thin metal layer 14 can be applied as electrical contacts to the front and back surfaces of the SMCA which provide entrance and exit paths for electrons when an electric field is established across the SMCA by means of the metallized contacts.

Although methods and apparatus are disclosed for providing a strip micro-channel array for use in mass spectrometer ion-electron conversion, other electro-optical applications immediately become apparent within the scope of this invention.

What is claimed is:

1. A strip microchannel array, comprising:
  a plurality of hollow square glass tubes, the internal surface of which is electron emissive, said tubes fused together to form a square glass electron multiplier means;
  a plurality of individual square glass electron multiplier means fused together in a linear array to form an elongated composite rectangle; and
  support means for holding said individual square electron multiplier means in a fixed position relative to each other to form the strip micro-channel array,
  said support means including a continuous first strip of material fused to one side of each said square electron multiplier means, a second continuous strip of material fused to an opposite side of each of said square electron multiplier means, a first substantially rectangular solid glass member fused at one end of the array to each of said first and second strips of material and to at least one of said square electron multiplier means and a second substantially rectangular solid glass member fused at the other end of the array to each of said first and second strips of material and to at least one of said square electron multiplier means at said other end of the array.

2. The strip microchannel array of claim 1 wherein said first and second strips comprise a material having a coefficient of thermal expansion compatible with glass.

3. The strip microchannel array of claim 1 wherein said material comprises glass.

* * * * *